United States Patent
Murakami et al.

(10) Patent No.: US 9,938,597 B2
(45) Date of Patent: Apr. 10, 2018

(54) METHOD FOR MANUFACTURING PRESS-FORMED PRODUCT AND PRESS-FORMED PRODUCT

(71) Applicant: Kobe Steel, Ltd., Kobe-shi (JP)

(72) Inventors: Toshio Murakami, Kobe (JP); Hideo Hata, Kobe (JP); Junya Naitou, Kobe (JP); Keisuke Okita, Kobe (JP); Shushi Ikeda, Nagoya (JP)

(73) Assignee: Kobe Steel, Ltd., Kobe-shi (JP)

( * ) Notice: Subject to any disclaimer, the term of this patent is extended or adjusted under 35 U.S.C. 154(b) by 635 days.

(21) Appl. No.: 14/382,139

(22) PCT Filed: Feb. 28, 2013

(86) PCT No.: PCT/JP2013/055534
§ 371 (c)(1),
(2) Date: Aug. 29, 2014

(87) PCT Pub. No.: WO2013/133137
PCT Pub. Date: Sep. 12, 2013

(65) Prior Publication Data
US 2015/0013856 A1 Jan. 15, 2015

(30) Foreign Application Priority Data
Mar. 9, 2012 (JP) .................................. 2012-053847

(51) Int. Cl.
*C21D 8/00* (2006.01)
*C22C 38/00* (2006.01)
(Continued)

(52) U.S. Cl.
CPC ............ *C21D 8/005* (2013.01); *B21D 22/208* (2013.01); *B21D 22/286* (2013.01); *C21D 6/02* (2013.01);
(Continued)

(58) Field of Classification Search
CPC . C21D 8/00; C21D 8/005; C21D 8/02; C21D 8/0205; C21D 8/0263;
(Continued)

(56) References Cited

U.S. PATENT DOCUMENTS

2003/0121576 A1 7/2003 Fujita et al.
2006/0185774 A1 8/2006 Nishibata et al.
(Continued)

FOREIGN PATENT DOCUMENTS

CN 1829813 A 9/2006
CN 101280352 10/2008
(Continued)

OTHER PUBLICATIONS

JP 2010-043323A Espacenet Machine Translation.*
(Continued)

*Primary Examiner* — Jennifer A Smith
*Assistant Examiner* — Alexandra M Moore
(74) *Attorney, Agent, or Firm* — Oblon, McClelland, Maier & Neustadt, L.L.P.

(57) ABSTRACT

In the present invention, a press-formed product is manufactured by heating a steel sheet for hot pressing use to a temperature of 900° C. or above and 1,100° C. or below, the steel sheet for hot pressing use having a predetermined chemical component composition, some of Ti-containing precipitates contained in the steel sheet, each of which having an equivalent circle diameter of 30 nm or less, having an average equivalent circle diameter of 6 nm or less, and the precipitated Ti amount and the total Ti amount in the steel fulfilling the relationship represented by formula (1) shown below, thereafter starting press-forming, and holding at the bottom dead point and cooling to a temperature lower than the martensite transformation starting temperature Ms while securing the average cooling rate of 20° C./s or more within a tool.

Precipitated Ti amount(mass %)−3.4[N]<0.5×[total Ti amount (mass %)−3.4[N]]    (1)

(In the formula (1), [N] represents the content (mass %) of N in the steel.).

8 Claims, 1 Drawing Sheet

(51) Int. Cl.

| | |
|---|---|
| *C22C 38/60* | (2006.01) |
| *C22C 38/02* | (2006.01) |
| *C22C 38/04* | (2006.01) |
| *C22C 38/06* | (2006.01) |
| *C22C 38/14* | (2006.01) |
| *C22C 38/28* | (2006.01) |
| *C22C 38/32* | (2006.01) |
| *B21D 22/20* | (2006.01) |
| *B21D 22/28* | (2006.01) |
| *C21D 6/02* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/42* | (2006.01) |
| *C22C 38/50* | (2006.01) |
| *C22C 38/54* | (2006.01) |
| *C21D 1/673* | (2006.01) |
| *B62D 29/00* | (2006.01) |

(52) U.S. Cl.
CPC ............ *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/14* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/42* (2013.01); *C22C 38/50* (2013.01); *C22C 38/54* (2013.01); *C22C 38/60* (2013.01); *B62D 29/007* (2013.01); *C21D 1/673* (2013.01); *C21D 2211/001* (2013.01); *C21D 2211/004* (2013.01); *C21D 2211/008* (2013.01)

(58) Field of Classification Search
CPC ...... C21D 8/0226; C21D 8/04; C21D 8/0405; C21D 6/00; C21D 6/02; C21D 1/00; C21D 1/02; B21D 22/286; C22C 38/00; C22C 38/14; C22C 38/001; C22C 38/005; C22C 38/02; C22C 38/04; C22C 38/06
See application file for complete search history.

(56) References Cited

U.S. PATENT DOCUMENTS

| | | | |
|---|---|---|---|
| 2006/0191612 A1* | 8/2006 | Yoshida | ........... C22C 38/12 148/603 |
| 2011/0030854 A1* | 2/2011 | Matsuda | ........... C21D 1/25 148/504 |
| 2011/0091348 A1* | 4/2011 | Hatano | ........... C21D 6/005 420/83 |
| 2011/0182765 A1 | 7/2011 | Giefers et al. | |

FOREIGN PATENT DOCUMENTS

| | | | |
|---|---|---|---|
| JP | 2002-309345 | | 10/2002 |
| JP | 2005288528 A | * | 10/2005 |
| JP | 2006-183139 | | 7/2006 |
| JP | 2010043323 A | * | 2/2010 |
| JP | 2010-65292 | | 3/2010 |
| JP | 2010-65293 | | 3/2010 |
| JP | 2010-65294 | | 3/2010 |
| JP | 2010-65295 | | 3/2010 |
| JP | 2010-126730 A | | 6/2010 |
| JP | 2010-174281 | | 8/2010 |
| JP | 2012-1802 | | 1/2012 |
| WO | WO 2009/082091 A1 | | 7/2009 |
| WO | WO 2012/169640 A1 | | 12/2012 |

OTHER PUBLICATIONS

JP 2005288528 Espacenet Machine Translation.*
U.S. Appl. No. 14/380,748, filed Aug. 25, 2014, Murakami, et al.
U.S. Appl. No. 14/382,437, filed Sep. 2, 2014, Murakami, et al.
U.S. Appl. No. 14/382,158, filed Aug. 29, 2014, Murakami, et al.
International Search Report and Written Opinion of the International Searching Authority dated Jun. 4, 2013, in PCT/JP13/055534 filed Feb. 28, 2013.
Liu, et al., "Enhanced mechanical properties of a hot stamped advanced high-strength steel treated by quenching and partitioning process", Scripta Materialia, Elsevier, vol. 64, No. 8, Apr. 2011, pp. 749-752.
Liu, et al., "Martensitic microstructural transformations from the hot stamping, quenching and partitioning process", ScienceDirect, Elsevier, Materials Characterization, vol. 62, No. 2, Feb. 2011, pp. 223-227.

* cited by examiner

METHOD FOR MANUFACTURING PRESS-FORMED PRODUCT AND PRESS-FORMED PRODUCT

TECHNICAL FIELD

The present invention relates to a press-formed product used in manufacturing structural components of an automobile and a method for manufacturing such a press-formed product, and relates more specifically to a press-formed product manufactured by applying a press forming method obtaining a predetermined strength by being subjected to heat treatment simultaneously with impartation of the shape in forming a pre-heated steel sheet (blank) into a predetermined shape, and a useful method for manufacturing such a press-formed product.

BACKGROUND ART

As one of the fuel economy improvement measures of an automobile triggered by global environment problems, weight reduction of the vehicle body is advancing, and it is necessary to high-strengthen a steel sheet used for an automobile as much as possible. On the other hand, when a steel sheet is high-strengthened, shape accuracy in press forming comes to deteriorate.

On this account, a hot press forming method has been employed for manufacturing components in which a steel sheet is heated to a predetermined temperature (for example, a temperature at which a state of an austenitic phase is achieved), the strength is lowered, the steel sheet is thereafter formed using a tool of a temperature (room temperature for example) lower than the steel sheet, thereby impartation of a shape and rapid heat treatment (quenching) utilizing the temperature difference of the both are executed simultaneously, and the strength after forming is secured. Also, such a hot-press forming method is referred to by various names such as a hot forming method, hot stamping method, hot stamp method, die quench method, and the like in addition to the hot press method.

Figure 1:
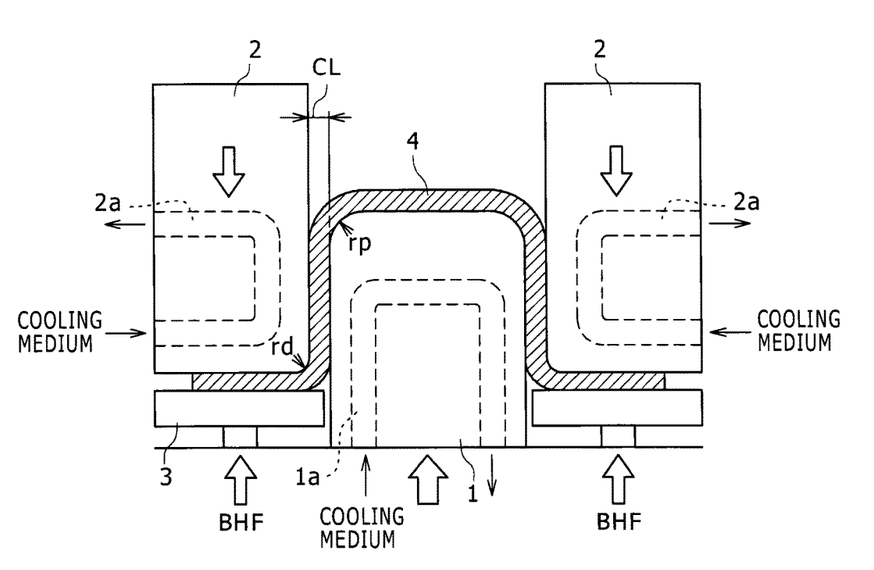
FIG. 1 is a schematic explanatory drawing showing a tool configuration for executing hot press forming.

FIG. 1 is a schematic explanatory drawing showing a tool configuration for executing hot press forming described above, 1 in the drawing is a punch, 2 is a die, 3 is a blank holder, 4 is a steel sheet (blank), BHF is a blank holding force, rp is punch shoulder radius, rd is die shoulder radius, and CL is punch/die clearance respectively. Also, out of these components, in the punch 1 and the die 2, passages 1a, 2a through which a cooling medium (water for example) can pass are formed inside of each, and it is configured that these members are cooled by making the cooling medium pass through these passages.

In hot press forming (hot deep drawing for example) using such a tool, forming is started in a state the steel sheet (blank) 4 is heated to a single-phase zone temperature of $Ac_3$ transformation point or above and is softened. That is, in a state the steel sheet 4 in a high temperature state is sandwiched between the die 2 and the blank holder 3, the steel sheet 4 is pressed in to the inside of a hole of the die 2 by the punch 1, and is formed into a shape corresponding to the shape of the outer shape of the punch 1 while reducing the outside diameter of the steel sheet 4. Also, by cooling the punch 1 and the die 2 in parallel with forming, heat removal from the steel sheet 4 to the tools (the punch 1 and the die 2) is executed, holding and cooling are further executed at a forming bottom dead point (the temporal point the tip of the punch is positioned at the deepest point: the state shown in FIG. 1), and thereby quenching of the raw material is executed. By executing such a forming method, a formed product of 1,500 MPa class with excellent dimensional accuracy can be obtained, the forming load can be reduced compared with a case a component of a same strength class is cold-formed, and therefore less capacity of the press machine is needed.

As a steel sheet for hot pressing use widely used at present, one using 22Mn-B5 steel as a raw material is known. The steel sheet has the tensile strength of approximately 1,500 MPa and the elongation of approximately 6-8%, and is applied to a shock resistant member (a member not causing deformation as much as possible and not causing breakage in collision). However, application to a component requiring deformation such as an energy absorption member is difficult because elongation (ductility) is low.

As a steel sheet for hot pressing use exerting excellent elongation, technologies such as the patent literatures 1-4 for example have also been proposed. According to these technologies, the basic strength class of each steel sheet is adjusted by setting the carbon content in the steel sheet to various ranges, and elongation is improved by introducing ferrite with high deformability and reducing the average grain size of ferrite and martensite.

On the other hand, although automobile components are required to be joined by spot welding, it is known that, in the hot stamp formed product whose microstructure is mainly of martensite, drop of the strength in the weld heat affected zone (HAZ) is extreme, and the strength of the welded joint drops (is softened) (non-patent literature 1 for example).

CITATION LIST

Patent Literature

[Patent Literature 1] JP-A 2010-065292
[Patent Literature 2] JP-A 2010-065293
[Patent Literature 3] JP-A 2010-065294
[Patent Literature 4] JP-A 2010-065295

Non-Patent Literature

[Non-Patent Literature 1] Hirosue et al. "Nippon Steel Technical Report" No. 378, pp. 15-20 (2003)

SUMMARY OF INVENTION

Technical Problems

The present invention has been developed in view of such circumstances as described above, and its object is to provide a method capable of obtaining a press-formed product that can achieve the balance of high strength and elongation with a high level and useful in obtaining a press-formed product that is excellent in softening prevention property in a HAZ, and such a press-formed product that the properties described above are exerted.

Solution to Problems

The method for manufacturing a press-formed product of the present invention which could achieve the object described above includes the steps of heating a steel sheet for hot pressing use to a temperature of 900° C. or above and 1,100° C. or below for 20 s or less, the steel sheet for hot pressing use containing:

C: 0.15-0.5% (means mass %, hereinafter the same with respect to the chemical component composition);

Si: 0.2-3%;

Mn: 0.5-3%;

P: 0.05% or less (exclusive of 0%);

S: 0.05% or less (exclusive of 0%);

Al: 0.01-1%;

B: 0.0002-0.01%;

Ti: 3.4[N]+0.01% or more and 3.4[N]+0.1% or less ([N] expresses the content (mass %) of N); and N: 0.001-0.01% respectively, with the remainder consisting of iron and inevitable impurities, in which some of Ti-containing precipitates contained in the steel sheet, each of which having an equivalent circle diameter of 30 nm or less, have an average equivalent circle diameter of 6 nm or less, and the precipitated Ti amount and the total Ti amount in the steel fulfill the relationship represented by formula (1) shown below, thereafter starting press-forming, and holding at the bottom dead point and cooling to a temperature lower than the martensite transformation starting temperature Ms while securing the average cooling rate of 20° C./s or more within a tool. Also, "equivalent circle diameter" is the diameter of an imaginary circle having an area same to the size (area) of Ti containing precipitates (TiC for example) ("the average equivalent circle diameter" is the average value thereof).

Precipitated Ti amount(mass %)−3.4[N]<0.5×[total Ti amount (mass %)−3.4[N]]  (1)

(In the formula (1), [N] represents the content (mass %) of N in the steel.)

In the steel sheet for hot pressing use of the present invention, according to the necessity, it is also useful to contain, as other elements, (a) at least one element selected from the group consisting of V, Nb and Zr by 0.1% or less (exclusive of 0%) in total, (b) at least one element selected from the group consisting of Cu, Ni, Cr and Mo by 1% or less (exclusive of 0%) in total, (c) at least one element selected from the group consisting of Mg, Ca and REM by 0.01% or less (exclusive of 0%) in total, and the like, and the properties of the press-formed product is improved further according to the kind of the elements contained.

In the press-formed product obtained by this method for manufacturing, the metal microstructure contains martensite: 80-97 area %, retained austenite: 3-20 area %, and the remainder microstructure: 5 area % or less, some of Ti-containing precipitates contained in the pressed steel, each of which having an equivalent circle diameter of 30 nm or less, have an average equivalent circle diameter of 10 nm or less, the relationship represented by the formula (1) shown above is fulfilled, and the balance of high strength and elongation can be achieved with a high level and as a uniform property within the press-formed product.

Advantageous Effects of Invention

According to the present invention, because a steel sheet is used in which the chemical component composition is strictly stipulated, the size of Ti-containing precipitates is controlled, and the precipitation rate is controlled for Ti that does not form TiN, by hot press forming the steel sheet under a predetermined condition, the high strength-elongation balance of the formed product can be made a high level, and the softening prevention property in a HAZ can be made excellent.

DESCRIPTION OF EMBODIMENTS

The present inventors carried out studies from various aspects in order to achieve such a press-formed product that can exhibit excellent ductility (elongation) also while securing high strength after press forming in manufacturing the press-formed product by heating a steel sheet to a predetermined temperature and thereafter executing hot press forming.

As a result, it was found out that, when the chemical component composition of the steel sheet for hot pressing use was strictly stipulated, the size of Ti-containing precipitates and precipitated Ti amount were controlled, by hot press forming of the steel sheet under a predetermined condition, a press-formed product in which retained austenite of a predetermined amount was secured after press forming, intrinsic ductility (residual ductility) was enhanced, and the softening prevention property in a HAZ was excellent could be obtained, and the present invention was completed.

In the steel sheet for hot pressing use that is used in the present invention, it is necessary to strictly stipulate the chemical component composition, and the reasons for limiting the range of each chemical component are as follows.

[C: 0.15-0.5%]

C is an important element in securing retained austenite. By concentration to austenite in heating to a single phase zone temperature of $Ac_3$ transformation point or above, retained austenite is formed after quenching. Further, C is also an important element in controlling increase the amount of martensite and the strength of martensite. When C content is less than 0.15%, a predetermined amount of retained austenite cannot be secured and excellent ductility is not obtained. Also, the strength of martensite is insufficient and the strength of the formed product deteriorates. On the other hand, when C content becomes excessive and exceeds 0.5%, the strength increases excessively, and the ductility deteriorates. Preferable lower limit of C content is 0.18% or more (more preferably 0.20% or more), and preferable upper limit is 0.45% or less (more preferably 0.40% or less).

[Si: 0.2-3%]

Si exerts an effect of increasing carbon of a solid solution state and forming retained austenite by suppressing the events that martensite is tempered during cooling of tool-quenching and cementite is formed. When Si content is less than 0.2%, a predetermined amount of retained austenite cannot be secured, and excellent ductility is not obtained. Also, when Si content becomes excessive and exceeds 3%, the solution strengthening amount increases excessively, and the ductility largely deteriorates. Preferable lower limit of Si content is 1.15% or more (more preferably 1.20% or more), and preferable upper limit is 2.7% or less (more preferably 2.5% or less).

[Mn: 0.5-3%]

Mn is an element stabilizing austenite and contributes to increase of retained austenite. Further, Mn is an element effective also in enhancing quenchability, suppressing formation of ferrite, pearlite and bainite during cooling after heating, and securing retained austenite. In order to exert such effects, Mn should be contained by 0.5% or more. Although Mn content is preferable to be as much as possible when only properties are considered, because the cost of adding alloy increases, Mn content is made 3% or less. Preferable lower limit of Mn content is 0.7% or more (more preferably 1.0% or more), and preferable upper limit is 2.5% or less (more preferably 2.0% or less).

[P: 0.05% or Less (Exclusive of 0%)]

Although P is an element inevitably included in steel, because P deteriorates ductility, P is preferable to be reduced as much as possible. However, because extreme reduction causes increase of the steel making cost and to make it 0% is difficult in manufacturing, P content is made 0.05% or less (exclusive of 0%). Preferable upper limit of P content is 0.045% or less (more preferably 0.040% or less).

[S: 0.05% or Less (Exclusive of 0%)]

Similar to P, S is also an element inevitably included in steel, S deteriorates ductility, and therefore S is preferable to be reduced as much as possible. However, because extreme reduction causes increase of the steel making cost and to make it 0% is difficult in manufacturing, S content is made 0.05% or less (exclusive of 0%). Preferable upper limit of S content is 0.045% or less (more preferably 0.040% or less).

[Al: 0.01-1%]

Al is useful as a deoxidizing element, fixes solid-solution N present in steel as AlN, and is useful in improving ductility. In order to effectively exert such an effect, Al content should be 0.01% or more. However, when Al content becomes excessive and exceeds 1%, $Al_2O_3$ is formed excessively, and ductility is deteriorated. Also, preferable lower limit of Al content is 0.02% or more (more preferably 0.03% or more), and preferable upper limit is 0.8% or less (more preferably 0.6% or less).

[B: 0.0002-0.01%]

B is an element effective in suppressing ferrite transformation, pearlite transformation and bainite transformation, suppressing formation of ferrite, pearlite and bainite during cooling after heating, and securing retained austenite. In order to exert such effects, B should be contained by 0.0002% or more, however, even when B is contained excessively exceeding 0.01%, the effects saturate. Preferable lower limit of B content is 0.0003% or more (more preferably 0.0005% or more), and preferable upper limit is 0.008% or less (more preferably 0.005% or less).

[Ti: 3.4[N]+0.01% or more and 3.4[N]+0.1% or less: [N] expresses N content (mass %)]

Ti develops improvement effect of quenchability by fixing N and holding B in a solid solution state. In order to exert such an effect, it is important to contain Ti more than the stoichiometric ratio of Ti and N (3.4 times of N content) by 0.01% or more. Also, by making Ti added excessively relative to N present in a solid solution state within the hot stamp formed product and finely dispersing the precipitated compound, drop of the strength in the HAZ can be suppressed by precipitation strengthening caused by that Ti dissolved is formed as TiC and by the effect of delaying increase of the dislocation density and the like by the effect of preventing movement of dislocation by TiC. However, when Ti content becomes excessive to be more than 3.4[N]+0.1%, Ti-containing precipitates (TiN for example) formed is coarsened, and ductility of the steel sheet deteriorates. Preferable lower limit of Ti content is 3.4[N]+0.02% or more (more preferably 3.4[N]+0.05% or more), and preferable upper limit is 3.4[N]+0.09% or less (more preferably 3.4[N]+0.08% or less).

[N: 0.001-0.01%]

Since N deteriorates the quenching improvement effect by fixing B as BN, N is preferable to be reduced as much as possible, however, because there is a limit in reducing N in an actual process, 0.001% is made the lower limit. Also, when N content becomes excessive, Ti-containing precipitates (TiN for example) formed is coarsened, these precipitates work as the fracture origin, ductility of the steel sheet is deteriorated, and therefore the upper limit is made 0.01%. Preferable upper limit of N content is 0.008% or less (more preferably 0.006% or less).

The basic chemical composition in the steel sheet for hot pressing use of the present invention is as described above, and the remainder is iron and inevitable impurities other than P, S (O, H and the like for example). Further, in the steel sheet for hot pressing use of the present invention, according to the necessity, it is also useful to further contain (a) at least one element selected from the group consisting of V, Nb and Zr by 0.1% or less (exclusive of 0%) in total, (b) at least one element selected from the group consisting of Cu, Ni, Cr and Mo by 1% or less (exclusive of 0%) in total, (c) at least one element selected from the group consisting of Mg, Ca and REM by 0.01% or less (exclusive of 0%) in total, and the like, and the properties of the steel sheet for hot pressing use are improved further according to the kind of the element contained. Preferable range when these elements are contained and reasons for limiting the range are as follows.

[At Least One Element Selected from the Group Consisting of V, Nb and Zr by 0.1% or Less (Exclusive of 0%) in Total]

V, Nb and Zr have effects of forming fine carbide and miniaturizing the microstructure by a pinning effect. In order to exert such effects, it is preferable to contain them by 0.001% or more in total. However, when the content of these elements becomes excessive, coarse carbide is formed and becomes a start point of breakage, and ductility is deteriorated adversely. Therefore, it is preferable to contain these elements by 0.1% or less in total. More preferable lower limit of the content of these elements in total is 0.005% or more (further more preferably 0.008% or more), and more preferable upper limit in total is 0.08% or less (further more preferably 0.06% or less).

[At Least One Element Selected from the Group Consisting of Cu, Ni, Cr and Mo: 1% or Less (Exclusive of 0%) in Total]

Cu, Ni, Cr and Mo suppress ferrite transformation, and pearlite transformation, therefore prevent formation of ferrite and pearlite during cooling after heating, and act effectively in securing retained austenite. In order to exert such effects, it is preferable to contain them by 0.01% or more in total. Although the content is preferable to be as much as possible when only the properties are considered, because the cost for adding alloys increases, 1% or less in total is preferable. Also, because there is an action of largely increasing the strength of austenite, the load of hot rolling increases, manufacturing of the steel sheet becomes difficult, and therefore 1% or less is also preferable from the viewpoint of manufacturability. More preferable lower limit of these elements in total is 0.05% or more (further more preferably 0.06% or more), and more preferable upper limit in total is 0.5% or less (further more preferably 0.3% or less).

[At Least One Element Selected from the Group Consisting of Mg, Ca and REM by 0.01% or Less (Exclusive of 0%) in Total]

Because these elements miniaturize inclusions, they act effectively in improving ductility. In order to exert such effects, it is preferable to contain them by 0.0001% or more in total. Although the content is preferable to be as much as possible when only the properties are considered, because the effects saturate, 0.01% or less in total is preferable. More preferable lower limit of these elements in total is 0.0002% or more (further more preferably 0.0005% or more), and more preferable upper limit in total is 0.005% or less (further more preferably 0.003% or less).

In the steel sheet for hot pressing use that is used in the present invention, (A) some of Ti-containing precipitates contained in the steel sheet, each of which having an equivalent circle diameter of 30 nm or less, have an average equivalent circle diameter of 6 nm or less, and (B) relationship of precipitated Ti amount (mass %)−3.4[N]<0.5×[(total Ti amount (mass %))−3.4[N]] (the relationship of the formula (1) described above) is fulfilled, are also important requirements.

Control of Ti-containing precipitates and the formula (1) is for preventing softening of the HAZ and is the control required fundamentally for a formed product, however, variation of these values between before and after hot-press forming is small, and therefore it is necessary that they have already been controlled at the stage of before forming (the steel sheet for hot pressing use). By making Ti that is excessive relative to N in the steel before forming be present in a solid solution state or a fine state, Ti-containing precipitates can be maintained in the solid solution state or the fine state in heating of hot press forming. Thus, the amount of precipitated Ti in the press-formed product can be controlled to a predetermined amount or less, softening in the HAZ is prevented, and thereby the properties of the welded joint can be improved.

From such a viewpoint, it is necessary to disperse the Ti-containing precipitates finely, and, for that purpose, it is necessary that some of the Ti-containing precipitates contained in the steel sheet, each of which having an equivalent circle diameter of 30 nm or less, have an average equivalent circle diameter of 6 nm or less (the requirement of (A) described above). Also, the reason the equivalent circle diameter of the Ti-containing precipitates of the object is stipulated to be 30 nm or less is that it is necessary to control the Ti-containing precipitates and excluding TiN formed coarsely in the melting stage that does not affect microstructure change and properties thereafter. The size of the Ti-containing precipitates (the average equivalent circle diameter of the Ti-containing precipitates whose equivalent circle diameter is 30 nm or less) is preferably 5 nm or less, more preferably 3 nm or less. Further, the Ti-containing precipitates of the object of the present invention also include precipitates containing Ti such as TiVC, TiNbC, TiVCN, TiNbCN and the like in addition to TiC and TiN.

Further, as described below, although the average equivalent circle diameter of the Ti-containing precipitates whose equivalent circle diameter in the press-formed product is 30 nm or less is stipulated to be 10 nm or less, the same before forming (the steel sheet for hot pressing use) is stipulated to be 6 nm or less. This is because Ti is present in the steel sheet as fine precipitates or in a solid solution state, and, when heating of 15 min or more at near 800° C. is executed, the Ti-containing precipitates are slightly coarsened. In order to secure the properties as a formed product, it is necessary that the average equivalent circle diameter of the Ti-containing precipitates whose equivalent circle diameter is 30 nm or less is 10 nm or less. In order to achieve the precipitation state in the hot stamp formed product, it is necessary that the average equivalent circle diameter of fine precipitates of 30 nm or less is made 6 nm or less and that majority of Ti is present in a solid solution state in the stage of the steel sheet for hot stamp use.

Also, in the steel sheet for hot pressing use, it is necessary that, out of Ti, majority of Ti other than that used for precipitating and fixing N is present in the solid solution state or the fine state. For that purpose, it is necessary that the Ti amount present as the precipitates other than TiN (that is, precipitated Ti amount (mass %)−3.4[N]) is an amount less than 0.5 times of the balance obtained by deducting Ti that forms TiN from total Ti (that is an amount less than 0.5×[(total Ti amount (mass %))−3.4[N]]) (the requirement of (B) described above). Precipitated Ti amount (mass %)−3.4[N] is preferably 0.4×[(total Ti amount (mass %))−3.4[N]] or less, more preferably 0.3×[(total Ti amount (mass %))−3.4[N]] or less.

The steel sheet (the steel sheet for hot pressing use) as described above can be manufactured by that a billet obtained by melting steel having the chemical component composition as described above is subjected to hot rolling with heating temperature: 1,100° C. or above (preferably 1,150° C. or above) and 1,300° C. or below (preferably 1,250° C. or below) and the finish rolling temperature of 850° C. or above (preferably 900° C. or above) and 1,000° C. or below (preferably 950° C. or below), cooling (rapid cooling) is executed immediately thereafter to 500° C. or below (preferably 450° C. or below) with the average cooling rate of 20° C./s or more (preferably 30° C./s or more), and winding is executed at 200° C. or above (preferably 250° C. or above) and 500° C. or below (preferably 450° C. or below).

The method described above is for executing control so that (1) rolling is finished at a temperature range where dislocation introduced by hot rolling remains within austenite, (2) Ti-containing precipitates such as TiC and the like are formed finely on the dislocation by rapid cooling immediately thereafter, and (3) martensite transformation is caused by rapid cooling and winding thereafter.

The steel sheet for hot pressing use having the chemical component composition and Ti-precipitation state as described above may be used for manufacturing by a hot press forming as it is, and may be used for manufacturing by hot press forming after being subjected to cold rolling with the draft: 10-80% (preferably 20-70%) after pickling. Further, it is also possible to subject the steel sheet for hot pressing use or the material obtained by cold rolling thereof to heat treatment in a temperature range where Ti-containing precipitates such as TiC and the like is not dissolved by 100% (1,000° C. or below for example). Also, the steel sheet for hot pressing use of the present invention may be subjected to plating containing at least one element out of Al, Zn, Mg and Si on the surface thereof (the surface of the base steel sheet).

By using the steel sheet for hot pressing use as described above, heating to a temperature of 900° C. or above and 1,100° C. or below, thereafter starting press-forming, holding at the bottom dead point, and cooling to a temperature lower than the martensite transformation starting temperature Ms while securing the average cooling rate of 20° C./s or more within the tool, the press formed product having a single property can have an optimum microstructure (the microstructure mainly of martensite) having a predetermined strength and high ductility. The reasons for stipulating each requirement in this forming method are as described below.

When the heating temperature of the steel sheet is lower than 900° C., sufficient austenite is not obtained in heating, and a predetermined amount of retained austenite cannot be secured in the final microstructure (the microstructure of the formed product). Also, by raising the heating temperature of the steel sheet, solid solution of Ti is promoted. However, when the heating temperature of the steel sheet exceeds 1,100° C., problems other than the material facets occur such that formation of oxidized scale is promoted in heating and a flaw caused by the oxidized scale is generated in press forming. The heating temperature is preferably 950° C. or above and 1,050° C. or below. Also, the heating time at that time is preferably 20 s or less from the viewpoint of preventing coarsening of prior austenite grain size while dissolving the precipitates.

In order to make austenite formed in the heating step described above desired microstructure (microstructure mainly of martensite) while preventing formation of the microstructure such as ferrite, pearlite, bainite and the like, it is necessary to hold the steel sheet at the bottom dead point and to properly control the average cooling rate and the cooling finishing temperature within the tool. From such a viewpoint, it is necessary to make the average cooling rate of this time 20° C./s or more and to make the cooling finishing temperature a temperature lower than the martensite transformation starting temperature Ms. The average cooling rate is preferably 30° C./s or more (more preferably 40° C./s or more). A predetermined amount of retained austenite is secured by making fine austenite remain between the laths of martensite while securing the martensite amount by making austenite having been present in heating transform to martensite while preventing formation of the microstructure such as ferrite, pearlite, bainite and the like by making the cooling finishing temperature a temperature lower than the martensite transformation starting temperature Ms.

When the rapid cooling finishing temperature described above becomes the martensite transformation starting temperature Ms or above and the average cooling rate is less than 20° C./s, the microstructure such as ferrite, pearlite, bainite and the like is formed, a predetermined amount of retained austenite cannot be secured, and the elongation (ductility) in the formed product deteriorates.

Although control of the average cooling rate basically becomes unnecessary at the stage the temperature becomes lower than the martensite transformation starting temperature Ms, cooling may be executed to the room temperature with the average cooling rate of 1° C./s or more and 100° C./s or less for example. Also, control of the average cooling rate within the tool while being held at the bottom dead point can be achieved by means such as (a) to control the temperature of the forming tool (the cooling medium shown in FIG. 1 above), and (b) to control the thermal conductivity of the tool.

In the press-formed product obtained by this method for manufacturing, the metal microstructure is formed of martensite: 80-97 area %, retained austenite: 3-20 area %, and the remainder microstructure: 5 area % or less, and the balance of high strength and elongation can be achieved with a high level and as a uniform property within the formed product. The reasons for setting the range of each requirement (basic microstructure) in such a press-formed product are as described below.

By making the main microstructure of the press-formed product martensite that is of high strength and rich in ductility, both of high strength and high ductility of the press-formed product can be achieved. From such a viewpoint, the area fraction of martensite should be 80 area % or more. However, when this fraction exceeds 97 area %, the fraction of retained austenite becomes insufficient, and the ductility (residual ductility) deteriorates. Preferable lower limit of the fraction of martensite is 83 area % or more (more preferably 85 area % or more), and preferable upper limit is 95 area % or less (more preferably 93 area % or less).

Retained austenite has an effect of increasing the work hardening ratio (transformation induced plasticity) and improving ductility of the press-formed product by being transformed to martensite during plastic deformation. In order to exert such an effect, the fraction of retained austenite should be made 3 area % or more. Ductility becomes more excellent as the fraction of retained austenite is higher. In the composition used for a steel sheet for an automobile, retained austenite that can be secured is limited, and approximately 20 area % becomes the upper limit. Preferable lower limit of retained austenite is 5 area % or more (more preferably 7 area % or more).

Although ferrite, pearlite, bainite and the like may be included as the remainder microstructure in addition to the microstructures described above, these microstructures are inferior in contribution to the strength and contribution to the ductility compared to other microstructures, and it is basically preferable not to be contained (it may be 0 area % also). However, up to 5 area % is allowable. The remainder microstructure is more preferably 4 area % or less, further more preferably 3 area % or less.

In the press-formed product described above, some of Ti-containing precipitates contained in the formed product, each of which having an equivalent circle diameter of 30 nm or less, have an average equivalent circle diameter of 10 nm or less. By fulfilling such a requirement, a press-formed product capable of achieving the balance of high strength and elongation with a high level can be obtained. The average equivalent circle diameter of Ti-containing precipitates having 30 nm or less equivalent circle diameter is preferably 8 nm or less, more preferably 6 nm or less.

Also, in the press-formed product, the amount of Ti present as the precipitates other than TiN (precipitated Ti amount (mass %)−3.4[N]) is less than 0.5 times of Ti of the balance obtained by deducting Ti that forms TiN from total Ti (that is, less than 0.5×[total Ti amount (mass %)−3.4[N]]). By fulfilling such a requirement, weldability becomes excellent by preventing drop of the hardness in a HAZ formed in spot welding by increasing TiC of a solid solution state which finely precipitates in spot welding. Precipitated Ti amount (mass %)−3.4[N] is preferably 0.4×[total Ti amount (mass %)−3.4[N]] or less, more preferably 0.3×[total Ti amount (mass %)−3.4[N]] or less.

According to the method of the present invention, because the properties such as strength, elongation and the like of the formed product can be controlled and the press-formed product with high ductility (residual ductility) is obtained by properly adjusting the press forming conditions (heating temperature and cooling rate), application to a portion (energy absorption member for example) to which conventional press-formed products have not been easily applied also becomes possible, which is very useful in expanding the application range of the hot press-formed product.

Although the effect of the present invention will be shown below more specifically by examples, the examples described below do not limit the present invention, and any of the design alterations judging from the purposes described above and below is to be included in the technical range of the present invention.

EXAMPLES

Steel (steel Nos. 1-31) having the chemical component composition shown in Table 1 below was molten in vacuum, was made a slab for experiment, was thereafter made a steel sheet by hot rolling, was thereafter cooled, and was subjected to treatment that simulates winding (sheet thickness:

3.0 mm). The winding simulated treatment method included cooling to the winding temperature, putting the sample thereafter into a furnace heated to the winding temperature, holding for 30 min, and cooling in the furnace. The manufacturing condition for the steel sheet at that time is shown in Table 2 below. Also, Ac$_3$ transformation point and Ms point in Table 1 were obtained using the formula (2) and the formula (3) below (refer to "The Physical Metallurgy of Steels", Leslie, Maruzen Company, Limited (1985) for example). Also, the treatments (1) and (2) shown in the remarks column in Table 2 express that each treatment (rolling, cooling, alloying) shown below was executed.

$$Ac_3 \text{ transformation point } (°C.) = \\ 910 - 203 \times [C]^{1/2} + 44.7 \times [Si] - 30 \times [Mn] + 700 \times [P] + \\ 400 \times [Al] + 400 \times [Ti] + 104 \times [V] - 11 \times [Cr] + \\ 31.5 \times [Mo] - 20 \times [Cu] - 15.2 \times [Ni] \quad (2)$$

$$Ms \text{ point } (°C.) = 550 - 361 \times [C] - 39 \times [Mn] - \\ 10 \times [Cu] - 17 \times [Ni] - 20 \times [Cr] - 5 \times [Mo] + 30 \times [Al] \quad (3)$$

wherein [C], [Si], [Mn], [P], [Al], [Ti], [V], [Cr], [Mo], [Cu] and [Ni] represent the content (mass %) of C, Si, Mn, P, Al, Ti, V, Cr, Mo, Cu and Ni respectively. Also, when the element shown in each term of the formula (2) and the formula (3) above is not contained, calculation is done assuming that the term is null.

Treatment (1): The hot-rolled steel sheet was cold-rolled (sheet thickness: 1.6 mm), continuous annealing was thereafter simulated by a heat treatment simulator by heating to 800° C., maintaining thereafter for 90 s, cooling to 500° C. with the average cooling rate of 20° C./s, and holding for 300 s.

Treatment (2): The hot-rolled steel sheet was cold-rolled (sheet thickness: 1.6 mm), was heated thereafter to 860° C. for simulating continuous hot-dip galvanizing line by a heat treatment simulator, was cooled thereafter to 400° C. with the average cooling rate of 30° C./s, was held, was further held thereafter by 500° C.×10 s for simulating immersion into plating bath-alloying treatment, and was cooled thereafter to the room temperature with the average cooling rate of 20° C./s.

TABLE 1

| Steel No. | Chemical component composition* (mass %) | | | | | | | | | | | |
|---|---|---|---|---|---|---|---|---|---|---|---|---|
| | C | Si | Mn | P | S | Al | B | Ti | N | V | Nb | Cu |
| 1 | 0.220 | 1.20 | 1.20 | 0.0050 | 0.0020 | 0.030 | 0.0020 | 0.044 | 0.0040 | — | — | — |
| 2 | 0.150 | 1.20 | 1.20 | 0.0050 | 0.0020 | 0.030 | 0.0020 | 0.044 | 0.0040 | — | — | — |
| 3 | 0.220 | 0.05 | 1.20 | 0.0050 | 0.0020 | 0.030 | 0.0020 | 0.044 | 0.0040 | — | — | — |
| 4 | 0.220 | 0.25 | 1.20 | 0.0050 | 0.0020 | 0.030 | 0.0020 | 0.044 | 0.0040 | — | — | — |
| 5 | 0.220 | 1.20 | 1.20 | 0.0050 | 0.0020 | 0.030 | 0.0020 | 0.019 | 0.0040 | — | — | — |
| 6 | 0.220 | 1.20 | 1.20 | 0.0050 | 0.0020 | 0.030 | 0.0020 | 0.044 | 0.0040 | — | — | — |
| 7 | 0.220 | 1.20 | 1.20 | 0.0050 | 0.0020 | 0.030 | 0.0020 | 0.044 | 0.0040 | — | — | — |
| 8 | 0.220 | 1.20 | 1.20 | 0.0050 | 0.0020 | 0.030 | 0.0020 | 0.044 | 0.0040 | — | — | — |
| 9 | 0.220 | 1.20 | 1.20 | 0.0050 | 0.0020 | 0.030 | 0.0020 | 0.044 | 0.0040 | — | — | — |
| 10 | 0.220 | 1.20 | 1.20 | 0.0050 | 0.0020 | 0.030 | 0.0020 | 0.044 | 0.0040 | — | — | — |
| 11 | 0.220 | 1.20 | 1.20 | 0.0050 | 0.0020 | 0.030 | 0.0020 | 0.044 | 0.0040 | — | — | — |
| 12 | 0.220 | 1.20 | 1.20 | 0.0050 | 0.0020 | 0.030 | 0.0020 | 0.044 | 0.0040 | — | — | — |
| 13 | 0.220 | 1.20 | 1.20 | 0.0050 | 0.0020 | 0.030 | 0.0020 | 0.044 | 0.0040 | — | — | — |
| 14 | 0.220 | 1.20 | 1.20 | 0.0050 | 0.0020 | 0.030 | 0.0020 | 0.044 | 0.0040 | — | — | — |
| 15 | 0.220 | 2.00 | 1.20 | 0.0050 | 0.0020 | 0.030 | 0.0020 | 0.044 | 0.0040 | — | — | — |
| 16 | 0.350 | 1.20 | 1.20 | 0.0050 | 0.0020 | 0.030 | 0.0020 | 0.044 | 0.0040 | — | — | — |
| 17 | 0.720 | 1.20 | 1.20 | 0.0050 | 0.0020 | 0.030 | 0.0020 | 0.044 | 0.0040 | — | — | — |
| 18 | 0.220 | 1.20 | 0.80 | 0.0050 | 0.0020 | 0.030 | 0.0020 | 0.044 | 0.0040 | — | — | — |
| 19 | 0.220 | 1.20 | 2.40 | 0.0050 | 0.0020 | 0.030 | 0.0020 | 0.044 | 0.0040 | — | — | — |
| 20 | 0.220 | 1.20 | 1.20 | 0.0050 | 0.0020 | 0.030 | 0.0020 | 0.100 | 0.0040 | — | — | — |
| 21 | 0.220 | 1.20 | 1.20 | 0.0050 | 0.0020 | 0.030 | 0.0020 | 0.200 | 0.0040 | — | — | — |
| 22 | 0.220 | 0.50 | 1.20 | 0.0050 | 0.0020 | 0.40 | 0.0020 | 0.044 | 0.0040 | — | — | — |
| 23 | 0.220 | 1.20 | 1.20 | 0.0050 | 0.0020 | 0.030 | 0.0020 | 0.044 | 0.0040 | 0.030 | — | — |
| 24 | 0.220 | 1.20 | 1.20 | 0.0050 | 0.0020 | 0.030 | 0.0020 | 0.044 | 0.0040 | — | 0.020 | — |
| 25 | 0.220 | 1.20 | 1.20 | 0.0050 | 0.0020 | 0.030 | 0.0020 | 0.044 | 0.0040 | — | — | 0.20 |
| 26 | 0.220 | 1.20 | 1.20 | 0.0050 | 0.0020 | 0.030 | 0.0020 | 0.044 | 0.0040 | — | — | — |
| 27 | 0.220 | 1.20 | 1.20 | 0.0050 | 0.0020 | 0.030 | 0.0020 | 0.044 | 0.0040 | — | — | — |
| 28 | 0.220 | 1.20 | 1.20 | 0.0050 | 0.0020 | 0.030 | 0.0020 | 0.044 | 0.0040 | — | — | — |
| 29 | 0.220 | 1.20 | 1.20 | 0.0050 | 0.0020 | 0.030 | 0.0020 | 0.044 | 0.0040 | — | — | — |
| 30 | 0.220 | 1.20 | 1.20 | 0.0050 | 0.0020 | 0.030 | 0.0020 | 0.044 | 0.0040 | — | — | — |
| 31 | 0.220 | 1.20 | 1.20 | 0.0050 | 0.0020 | 0.030 | 0.0020 | 0.044 | 0.0040 | — | — | — |

| Steel No. | Chemical component composition* (mass %) | | | | | | | Ac$_3$ (° C.) | Ms point (° C.) |
|---|---|---|---|---|---|---|---|---|---|
| | Ni | Zr | Mg | Ca | REM | Cr | Mo | | |
| 1 | — | — | — | — | — | — | — | 865 | 425 |
| 2 | — | — | — | — | — | 0.20 | — | 880 | 446 |
| 3 | — | — | — | — | — | 0.20 | — | 812 | 421 |
| 4 | — | — | — | — | — | 0.20 | — | 821 | 421 |
| 5 | — | — | — | — | — | 0.20 | — | 853 | 421 |
| 6 | — | — | — | — | — | 0.20 | — | 863 | 421 |
| 7 | — | — | — | — | — | 0.20 | — | 863 | 421 |
| 8 | — | — | — | — | — | 0.20 | — | 863 | 421 |
| 9 | — | — | — | — | — | 0.20 | — | 863 | 421 |
| 10 | — | — | — | — | — | 0.20 | — | 863 | 421 |
| 11 | — | — | — | — | — | 0.20 | — | 863 | 421 |

TABLE 1-continued

| No. | | | | | | | | | |
|---|---|---|---|---|---|---|---|---|---|
| 12 | — | — | — | — | — | 0.20 | — | 863 | 421 |
| 13 | — | — | — | — | — | 0.20 | — | 863 | 421 |
| 14 | — | — | — | — | — | 0.20 | — | 863 | 421 |
| 15 | — | — | — | — | — | 0.20 | — | 899 | 421 |
| 16 | — | — | — | — | — | 0.20 | — | 838 | 374 |
| 17 | — | — | — | — | — | 0.20 | — | 786 | 240 |
| 18 | — | — | — | — | — | 0.20 | — | 875 | 436 |
| 19 | — | — | — | — | — | 0.20 | — | 827 | 374 |
| 20 | — | — | — | — | — | 0.20 | — | 886 | 421 |
| 21 | — | — | — | — | — | 0.20 | — | 926 | 421 |
| 22 | — | — | — | — | — | 0.20 | — | 980 | 432 |
| 23 | — | — | — | — | — | 0.20 | — | 866 | 421 |
| 24 | — | — | — | — | — | 0.20 | — | 863 | 421 |
| 25 | — | — | — | — | — | 0.20 | — | 859 | 419 |
| 26 | 0.20 | — | — | — | — | 0.20 | — | 860 | 417 |
| 27 | — | — | — | — | — | 0.20 | 0.20 | 869 | 420 |
| 28 | — | 0.01 | — | — | — | 0.20 | — | 864 | 421 |
| 29 | — | — | 0.002 | — | — | 0.20 | — | 863 | 421 |
| 30 | — | — | — | 0.002 | — | 0.20 | — | 863 | 421 |
| 31 | — | — | — | — | 0.002 | 0.20 | — | 863 | 421 |

*The remainder: iron and inevitable impurities other than P, S, N.

TABLE 2

Steel sheet manufacturing condition

| Steel No. | Heating temperature (° C.) | Finish rolling temperature (° C.) | Average cooling rate between finish rolling temperature and winding temperature (° C./s) | Winding temperature (° C.) | Remarks |
|---|---|---|---|---|---|
| 1 | 1200 | 950 | 20 | 500 | — |
| 2 | 1200 | 950 | 20 | 500 | — |
| 3 | 1200 | 950 | 20 | 500 | — |
| 4 | 1200 | 950 | 20 | 500 | — |
| 5 | 1200 | 950 | 20 | 500 | — |
| 6 | 1200 | 950 | 20 | 500 | — |
| 7 | 1200 | 950 | 20 | 500 | — |
| 8 | 1200 | 800 | 20 | 500 | — |
| 9 | 1200 | 950 | 20 | 500 | Treatment (1) |
| 10 | 1200 | 950 | 20 | 500 | Treatment (2) |
| 11 | 1200 | 950 | 20 | 500 | — |
| 12 | 1200 | 950 | 20 | 500 | — |
| 13 | 1200 | 950 | 20 | 500 | — |
| 14 | 1200 | 950 | 20 | 500 | — |
| 15 | 1200 | 950 | 20 | 500 | — |
| 16 | 1200 | 950 | 20 | 500 | — |
| 17 | 1200 | 950 | 20 | 500 | — |
| 18 | 1200 | 950 | 20 | 500 | — |
| 19 | 1200 | 950 | 20 | 500 | — |
| 20 | 1200 | 950 | 20 | 500 | — |
| 21 | 1200 | 950 | 20 | 500 | — |
| 22 | 1200 | 980 | 20 | 500 | — |
| 23 | 1200 | 950 | 20 | 500 | — |
| 24 | 1200 | 950 | 20 | 500 | — |
| 25 | 1200 | 950 | 20 | 500 | — |
| 26 | 1200 | 950 | 20 | 500 | — |
| 27 | 1200 | 950 | 20 | 500 | — |
| 28 | 1200 | 950 | 20 | 500 | — |
| 29 | 1200 | 950 | 20 | 500 | — |
| 30 | 1200 | 950 | 20 | 500 | — |
| 31 | 1200 | 950 | 20 | 500 | — |

With respect to the steel sheet obtained, analysis of the precipitation state of Ti (precipitated Ti amount (mass %)−3.4[N], average equivalent circle diameter of Ti-containing precipitates) was executed by the procedure described below. The result is shown in Table 3 below along with the calculated value of 0.5×[total Ti amount(mass %)−3.4[N]] (expressed as 0.5×(total Ti amount−3.4[N])).

[Analysis of Precipitation State of Ti of Steel Sheet]

An extraction replica sample was prepared, and a transmission electron microscope image (magnifications: 100,000 times) of Ti-containing precipitates was photographed using a transmission electron microscope (TEM). At this time, by composition analysis of the precipitates using an energy dispersion type X-ray spectrometer (EDX), Ti-containing precipitates were identified. The area of the Ti-containing precipitates of at least 100 pieces was measured by image analysis, those having the equivalent circle diameter of 30 nm or less were extracted, and the average value thereof was made the size of the precipitates. Also, in the table, the size is shown as "average equivalent circle diameter of Ti-containing precipitates". Further, with respect to precipitated Ti amount (mass %)−3.4[N] (the Ti amount present as the precipitates), extraction residue analysis (in extraction treatment, the precipitates coagulate, and fine precipitates also can be measured) was executed using a mesh with mesh diameter: 0.1 μm, and precipitated Ti amount (mass %)−3.4[N] (expressed as "precipitated Ti amount−3.4[N]" in Table 3) was obtained. Also, when the Ti-containing precipitates partly contained V and Nb, the contents of these precipitates were also measured.

TABLE 3

Steel sheet for press forming use

| Steel No. | Precipitated Ti amount − 3.4[N] (mass %) | 0.5 × (total Ti amount − 3.4[N]) (mass %) | Average equivalent circle diameter of Ti-containing precipitates (nm) |
|---|---|---|---|
| 1 | 0.007 | 0.015 | 2.7 |
| 2 | 0.008 | 0.015 | 3.5 |
| 3 | 0.008 | 0.015 | 2.1 |
| 4 | 0.008 | 0.015 | 2.0 |
| 5 | 0.001 | 0.003 | 2.4 |
| 6 | 0.008 | 0.015 | 3.2 |
| 7 | 0.008 | 0.015 | 3.2 |
| 8 | 0.018 | 0.015 | 9.2 |
| 9 | 0.008 | 0.015 | 2.4 |
| 10 | 0.010 | 0.015 | 3.9 |
| 11 | 0.008 | 0.015 | 2.8 |
| 12 | 0.008 | 0.015 | 2.8 |
| 13 | 0.008 | 0.015 | 2.8 |
| 14 | 0.008 | 0.015 | 2.8 |
| 15 | 0.007 | 0.015 | 2.2 |
| 16 | 0.008 | 0.015 | 3.9 |
| 17 | 0.007 | 0.015 | 2.1 |
| 18 | 0.007 | 0.015 | 3.9 |
| 19 | 0.008 | 0.015 | 2.2 |
| 20 | 0.025 | 0.043 | 3.9 |
| 21 | 0.128 | 0.093 | 10.8 |
| 22 | 0.006 | 0.015 | 3.0 |
| 23 | 0.008 | 0.015 | 3.3 |
| 24 | 0.008 | 0.015 | 3.3 |
| 25 | 0.007 | 0.015 | 3.8 |
| 26 | 0.008 | 0.015 | 3.8 |
| 27 | 0.008 | 0.015 | 3.5 |
| 28 | 0.007 | 0.015 | 2.7 |
| 29 | 0.008 | 0.015 | 2.5 |
| 30 | 0.007 | 0.015 | 2.4 |
| 31 | 0.008 | 0.015 | 2.2 |

Each steel sheet described above (1.6 mm$^t$×150 mm×200 mm) (with respect to those other than the treatment of (1) and (2) described above, the thickness was adjusted to 1.6 mm by hot rolling) was heated to a predetermined temperature in a heating furnace, and was thereafter subjected to press forming and cooling treatment using the tool (FIG. 1 above) of a hat shape to obtain the formed product. The press forming conditions (heating temperature, average cooling rate, and rapid cooling finishing temperature in press forming) are shown in Table 4 below.

TABLE 4

Press forming condition

| Steel No. | Heating temperature (° C.) | Heating time (s) | Average cooling rate (° C./s) | Rapid cooling finishing temperature (° C.) |
|---|---|---|---|---|
| 1 | 900 | 180 | 40 | 300 |
| 2 | 900 | 180 | 40 | 300 |
| 3 | 900 | 180 | 40 | 300 |
| 4 | 900 | 180 | 40 | 300 |
| 5 | 900 | 180 | 40 | 300 |
| 6 | 900 | 180 | 40 | 300 |
| 7 | 970 | 15 | 40 | 300 |
| 8 | 900 | 180 | 40 | 300 |
| 9 | 900 | 180 | 40 | 300 |
| 10 | 900 | 180 | 40 | 300 |
| 11 | 900 | 180 | 40 | 300 |
| 12 | 800 | 180 | 40 | 300 |
| 13 | 900 | 180 | 5 | 300 |
| 14 | 900 | 180 | 40 | 600 |
| 15 | 900 | 180 | 40 | 300 |
| 16 | 900 | 180 | 40 | 300 |
| 17 | 900 | 180 | 40 | 300 |
| 18 | 900 | 180 | 40 | 300 |
| 19 | 900 | 180 | 40 | 300 |
| 20 | 900 | 180 | 40 | 300 |
| 21 | 900 | 180 | 40 | 300 |
| 22 | 900 | 180 | 40 | 300 |
| 23 | 900 | 180 | 40 | 300 |
| 24 | 900 | 180 | 40 | 300 |
| 25 | 900 | 180 | 40 | 300 |
| 26 | 900 | 180 | 40 | 300 |
| 27 | 900 | 180 | 40 | 300 |
| 28 | 900 | 180 | 40 | 300 |
| 29 | 900 | 180 | 40 | 300 |
| 30 | 900 | 180 | 40 | 300 |
| 31 | 900 | 180 | 40 | 300 |

With respect to the formed product obtained, the precipitation state of Ti in the formed product was analyzed by the method described above, and tensile strength (TS), elongation (total elongation EL), observation of the metal microstructure (the fraction of each microstructure), and hardness drop amount after heat treatment were measured by methods described below.

[Measurement of Tensile Strength (TS) and Elongation (Total Elongation EL)]

The tensile test was executed using JIS No. 5 test specimen, and the tensile strength (TS) and the elongation (EL) were measured. At this time, the strain rate of the tensile test was made 10 mm/s. In the present invention, the case either of 1,470 MPa or more of the tensile strength (TS) and 10% or more of the elongation (EL) or 1,800 MPa or more of the tensile strength (TS) and 9% or more of the elongation (EL) was fulfilled and the strength-elongation balance (TS×EL) was 15,000 (MPa·%) or more was evaluated to have passed.

(Observation of Metal Microstructure (Fraction of Each Microstructure))

(1) With respect to the microstructure of martensite, ferrite or bainite in the formed product, the steel sheet was corroded by nital, martensite, ferrite and bainite were distinguished from each other by SEM observation (magnifications: 1,000 times or 2,000 times), and each fraction (area ratio) was obtained.

(2) The retained austenite fraction in the formed product was measured by X-ray diffraction method after the steel sheet was ground up to ¼ thickness thereof and was thereafter subjected to chemical polishing (for example, ISJJ Int. Vol. 33. (1933), No. 7, P. 776).

[Hardness Drop Amount after Heat Treatment]

As the thermal hysteresis based on spot welding, heating was executed to 700° C. with the average heating rate of 50° C./s using a heat treatment simulator, cooling was thereafter executed with the average cooling rate of 50° C./s, and the hardness drop amount (ΔHv) relative to the original hardness (Vickers hardness) was measured. When the hardness drop amount (ΔHv) was 50 Hv or less, the softening prevention property in the HAZ was determined to be excellent.

The observation results of the metal microstructure (fraction of each microstructure, precipitation state of Ti, precipitated Ti amount (mass %)−3.4[N]) are shown in Table 5 below. Also, the mechanical properties (tensile strength TS, elongation EL, TS×EL, and hardness drop amount ΔHv) of the formed product are shown in Table 6 below. Further, although the value of the precipitated Ti amount (mass %)−3.4[N] in the formed product is slightly different compared to the value of the precipitated Ti amount (mass %)−3.4[N] in the steel sheet for press forming use. This is because the precipitation size changes since TiC grows or newly precipitates in heating.

TABLE 5

Metal microstructure of formed product

| Steel No. | Fraction of martensite (area %) | Fraction of ferrite (area %) | Fraction of retained austenite (area %) | Others | Average equivalent circle diameter of Ti-containing precipitates (nm) | Precipitated Ti amount-3.4[N] (mass %) | 0.5 × (total Ti amount-3.4[N]) (mass %) |
|---|---|---|---|---|---|---|---|
| 1 | 95 | 0 | 5 | — | 3.8 | 0.008 | 0.015 |
| 2 | 94 | 0 | 6 | — | 2.8 | 0.011 | 0.015 |
| 3 | 100 | 0 | 0 | — | 3.4 | 0.012 | 0.015 |
| 4 | 96 | 0 | 4 | — | 3.6 | 0.013 | 0.015 |
| 5 | 94 | 0 | 6 | — | 2.6 | 0.000 | 0.003 |
| 6 | 92 | 0 | 8 | — | 3.1 | 0.010 | 0.015 |
| 7 | 92 | 0 | 8 | — | 3.0 | 0.002 | 0.015 |
| 8 | 93 | 0 | 7 | — | 12.0 | 0.023 | 0.015 |
| 9 | 93 | 0 | 7 | — | 2.3 | 0.012 | 0.015 |
| 10 | 92 | 0 | 8 | — | 2.8 | 0.018 | 0.015 |
| 11 | 93 | 0 | 7 | — | 3.9 | 0.013 | 0.015 |
| 12 | 26 | 47 | 7 | Bainite: 20% (Acicular ferrite out of ferrite 32%) | 2.4 | 0.002 | 0.015 |
| 13 | 53 | 15 | 8 | Bainite: 24% | 2.9 | 0.009 | 0.015 |
| 14 | 62 | 11 | 0 | Bainite: 27% | 2.2 | 0.011 | 0.015 |
| 15 | 91 | 0 | 9 | — | 2.1 | 0.012 | 0.015 |
| 16 | 93 | 0 | 7 | — | 3.7 | 0.011 | 0.015 |
| 17 | 80 | 8 | 12 | — | 3.1 | 0.010 | 0.015 |
| 18 | 93 | 0 | 7 | — | 3.5 | 0.011 | 0.015 |
| 19 | 94 | 0 | 6 | — | 3.0 | 0.010 | 0.015 |
| 20 | 94 | 0 | 6 | — | 3.4 | 0.037 | 0.043 |
| 21 | 92 | 0 | 8 | — | 13.8 | 0.180 | 0.093 |
| 22 | 92 | 0 | 8 | — | 2.6 | 0.008 | 0.015 |
| 23 | 93 | 0 | 7 | — | 3.5 | 0.009 | 0.015 |
| 24 | 93 | 0 | 7 | — | 3.6 | 0.009 | 0.015 |
| 25 | 94 | 0 | 6 | — | 3.3 | 0.011 | 0.015 |
| 26 | 93 | 0 | 7 | — | 3.2 | 0.009 | 0.015 |
| 27 | 93 | 0 | 7 | — | 2.1 | 0.011 | 0.015 |
| 28 | 95 | 0 | 5 | — | 3.5 | 0.010 | 0.015 |
| 29 | 94 | 0 | 6 | — | 3.2 | 0.011 | 0.015 |
| 30 | 95 | 0 | 5 | — | 3.4 | 0.012 | 0.015 |
| 31 | 96 | 0 | 4 | — | 2.9 | 0.012 | 0.015 |

TABLE 6

Mechanical properties of formed product

| Steel No. | Tensile strength TS (MPa) | Elongation EL (%) | TS × EL (MPa-%) | Hardness drop amount ΔHv (Hv) |
|---|---|---|---|---|
| 1 | 1504 | 10.5 | 15807 | 37 |
| 2 | 1321 | 12.1 | 15959 | 40 |
| 3 | 1517 | 7.8 | 11833 | 41 |
| 4 | 1559 | 10.1 | 15817 | 39 |
| 5 | 1520 | 10.6 | 16040 | 43 |
| 6 | 1566 | 10.2 | 15902 | 42 |
| 7 | 1555 | 10.5 | 16328 | 25 |
| 8 | 1537 | 10.4 | 15933 | 68 |
| 9 | 1542 | 10.2 | 15709 | 41 |
| 10 | 1515 | 10.4 | 15732 | 52 |
| 11 | 1552 | 10.3 | 15963 | 44 |
| 12 | 1051 | 21.2 | 22321 | 40 |
| 13 | 1205 | 13.4 | 16188 | 44 |
| 14 | 1260 | 12.7 | 16001 | 44 |
| 15 | 1509 | 10.7 | 16184 | 40 |
| 16 | 1825 | 10.2 | 18615 | 44 |
| 17 | 2110 | 2.3 | 4853 | 42 |
| 18 | 1568 | 10.0 | 15703 | 44 |
| 19 | 1535 | 10.4 | 15973 | 40 |
| 20 | 1519 | 10.5 | 15999 | 35 |
| 21 | 1333 | 8.9 | 15908 | 98 |
| 22 | 1532 | 10.5 | 16147 | 43 |
| 23 | 1514 | 10.6 | 16037 | 37 |
| 24 | 1546 | 10.2 | 15710 | 42 |
| 25 | 1531 | 10.3 | 15766 | 40 |
| 26 | 1506 | 10.7 | 16158 | 38 |
| 27 | 1536 | 10.2 | 15713 | 37 |
| 28 | 1521 | 11.5 | 17492 | 35 |
| 29 | 1511 | 11.8 | 17830 | 35 |
| 30 | 1531 | 11.3 | 17300 | 36 |
| 31 | 1512 | 11.5 | 17388 | 39 |

From these results, following consideration can be made. Those of the steel Nos. 1, 2, 4-7, 9-11, 15, 16, 18-20, 22-31 are examples fulfilling the requirements stipulated in the present invention, and it is known that components excellent in strength-elongation balance and excellent in softening prevention property have been obtained.

On the other hand, those of the steel Nos. 3, 8, 12-14, 17, 21 are the comparative examples not satisfying any of the requirements stipulated in the present invention, and any of the properties is deteriorated. That is, in that of the steel No. 3, the steel sheet with low Si content is used, the fraction of retained austenite in the formed product is not secured, and the elongation is not enough.

In that of the steel No. 8, the finish rolling temperature in manufacturing the steel sheet is low, the steel sheet does not fulfill the relationship of the formula (1), and the softening prevention property is deteriorated. In that of the steel No. 12, the heating temperature in press forming is low, formation of martensite is less, and the strength becomes too low.

In that of the steel No. 13, the average cooling rate in press forming is slow, the area ratio of martensite cannot be secured, and the strength becomes too low. In that of the steel No. 14, the rapid cooling finishing temperature in press forming is high, the area ratio of martensite cannot be secured, and the strength becomes too low.

In that of the steel No. 17, the steel sheet with excessive C content is used, the strength of the formed product increases, and only low elongation EL is obtained. In that of the steel No. 21, a steel sheet with excessive Ti content is used, Ti-containing precipitates are formed coarsely in the heating stage of hot rolling, therefore the average equivalent circle diameter of Ti carbide in the steel sheet for press forming use becomes coarse, there is scarcely a solid solution Ti amount and the relationship of the formula (1) is not fulfilled, there is scarcely solid solution Ti in the formed product and the relationship of the formula (1) is not fulfilled, and therefore the hardness drop amount in the weld HAZ increases.

Although the present invention has been described in detail and referring to specific embodiments, it is obvious for a person with an ordinary skill in the art that various alterations and amendments can be effected without departing from the spirit and the range of the present invention.

The present application is based on Japanese Patent Application (JP-A-No. 2012-053847) applied on Mar. 9, 2012, and the contents thereof are hereby incorporated by reference.

INDUSTRIAL APPLICABILITY

The present invention is suitable to manufacturing of press-formed products used in manufacturing structural components of an automobile.

REFERENCE SIGNS LIST

1 . . . punch
2 . . . die
3 . . . blank holder
4 . . . steel sheet (blank)

The invention claimed is:

1. A method for manufacturing a press-formed product, the method comprising
winding a steel sheet at a winding temperature of from 200° C. to 500° C.,
heating the steel sheet to a temperature of from 900° C. to 1,100° C., thus forming a heated steel sheet, and
press-forming the heated steel sheet to form the press-formed product by holding the heated steel sheet at a bottom dead point and cooling to a cooling finish temperature of lower than martensite transformation starting temperature Ms at an average cooling rate of 20° C./s or more,
wherein
the steel sheet comprises: by mass %,
iron;
C: 0.15-0.5%;
Si: 0.2-3%;
Mn: 0.5-3%;
P: a positive amount of 0.05% or less;
S: a positive amount of 0.05% or less;
Al: 0.01-1%;
B: 0.0002-0.01%;
N: 0.001-0.01%; and
Ti: 3.4[N]+0.01% or more and 3.4[N]+0.1% or less, where [N] is an amount of N in the steel sheet by mass %,
an average equivalent circle diameter of fine Ti-containing precipitates in the steel sheet is 6 nm or less, the fine Ti-containing precipitates in the steel sheet being Ti-containing precipitates that have an equivalent circle diameter of 30 nm or less, and
a precipitated Ti amount by mass % represented by $[Ti]_{precipitated}$, an amount of N by mass % represented by [N], and a total Ti amount by mass % represented by [Ti] in the steel sheet satisfy formula (1):

$$[Ti]_{precipitated} - 3.4[N] < 0.5 \times ([Ti] - 3.4[N]) \qquad (1).$$

2. The method according to claim 1, wherein the steel sheet further comprises, by mass %, at least one of
(a) at least one element selected from the group consisting of V, Nb, and Zr in a total positive amount of 0.1% or less;
(b) at least one element selected from the group consisting of Cu, Ni, Cr, and Mo in a total positive amount of 1% or less; and
(c) at least one element selected from the group consisting of Mg, Ca, and REM in a total positive amount of 0.01% or less.

3. The method according to claim 1, wherein the steel sheet comprises Al, by mass %, of from 0.4% to 1%.

4. The method according to claim 1, wherein the precipitated Ti amount $[Ti]_{precipitated}$, the amount of N [N] and the total Ti amount [Ti] in the steel sheet satisfy:

$$[Ti]_{precipitated} - 3.4[N] < 0.4 \times ([Ti] - 3.4[N]).$$

5. The method according to claim 1, wherein the precipitated Ti amount $[Ti]_{precipitated}$, the amount of N [N], and the total Ti amount [Ti] in the steel sheet satisfy:

$$[Ti]_{precipitated} - 3.4[N] < 0.3 \times ([Ti] - 3.4[N]).$$

6. The method according to claim 1, wherein the average equivalent circle diameter of the fine Ti-containing precipitates in the steel sheet is 5 nm or less.

7. The method according to claim 1, wherein the average equivalent circle diameter of the fine Ti-containing precipitates in the steel sheet is 3 nm or less.

8. The method according to claim 1, further comprising:
cooling from the cooling finish temperature to room temperature at an average cooling rate ranging from 1° C./s to 100° C./s.

* * * * *